(12) United States Patent
Heuer et al.

(10) Patent No.: US 7,831,903 B2
(45) Date of Patent: *Nov. 9, 2010

(54) METHOD AND DEVICE FOR CODING AND DECODING STRUCTURED DOCUMENTS

(75) Inventors: Jörg Heuer, Oberhaching (DE); Andreas Hutter, München (DE); Daniel Peintner, München (DE)

(73) Assignee: Siemens Aktiengesellschaft, Munich (DE)

( * ) Notice: Subject to any disclaimer, the term of this patent is extended or adjusted under 35 U.S.C. 154(b) by 234 days.

This patent is subject to a terminal disclaimer.

(21) Appl. No.: 10/590,791

(22) PCT Filed: Jan. 21, 2005

(86) PCT No.: PCT/EP2005/050264

§ 371 (c)(1),
(2), (4) Date: Aug. 25, 2006

(87) PCT Pub. No.: WO2005/084029

PCT Pub. Date: Sep. 9, 2005

(65) Prior Publication Data

US 2007/0261022 A1     Nov. 8, 2007

(30) Foreign Application Priority Data

Feb. 27, 2004    (DE) .................. 10 2004 009 617

(51) Int. Cl.
*G06F 17/00*    (2006.01)
(52) U.S. Cl. ............... 715/234; 715/260; 709/219; 709/227; 726/5
(58) Field of Classification Search ............ 715/234, 715/235–250
See application file for complete search history.

(56) References Cited

U.S. PATENT DOCUMENTS

2002/0138514 A1* 9/2002 Rising et al. ............... 707/512
2002/0138517 A1* 9/2002 Mory et al. ................ 707/234

(Continued)

FOREIGN PATENT DOCUMENTS

DE          10351897         2/2005

(Continued)

OTHER PUBLICATIONS

Hu et al. ("Multimedia Description Framework (MDF) for Content Description of Audio/Video Documents" published 1999 By ACM, Berkley, CA USA pp. 67-75.*

(Continued)

*Primary Examiner*—Doug Hutton
*Assistant Examiner*—Quoc A Tran
(74) *Attorney, Agent, or Firm*—Harness, Dickey & Pierce, P.L.C.

(57) ABSTRACT

A method is disclosed for coding a structured document, wherein a plurality of codes is generated by use of one or more schemata and/or name spaces. For a schema and/or a name space and/or for a group of schemata and/or name spaces independent codes for the elements defined or declared in the schemata and/or in the groups of schemata and/or name spaces are allocated. For every schema and/or name space an allocation to additional schemata and/or name spaces is carried out. A corresponding coding method, a coding device, a decoding device and a coding/decoding device are also disclosed.

20 Claims, 6 Drawing Sheets

U.S. PATENT DOCUMENTS

2004/0068696 A1* 4/2004 Seyrat et al. ............ 715/234

FOREIGN PATENT DOCUMENTS

WO    WO 02/063775 A2    8/2002
WO    WO 03/001811 A1    1/2003

OTHER PUBLICATIONS

ISO/IEC JTC1/SC29/WG11 International Organisation for Standardisation, Coding of moving Pictures and Audio; Title: Results of CE on Specification consistency—Item c—Schema Transmission Framework, MPEG03/9889; Authors: Lederer et al, Siemens AG, XP-002330762.

The Java (TM) Virtual Machine Specification (2nd Edition) by Tim Lindholm 1a) Chapter 2 Seite 15 und 16+1b) Chapter 4 Seiten 1bis6+1c) chapter 5 Seiten 1bis10.pdf , Apr. 14, 1999, ISBN: 0201432943.

ISO/IEC JTC1/SC29/WG11 International Organisation for Standardisation, Coding of moving Pictures and Associated Audio; Title: Text of ISO/IEC FCD 15938—Information technology—Multimedia content description interface—Part 1 Systems; Editor: Claude Seyrat et al., Mar. 2001, Singapore; XP-001001465.

XML Schema Part 0: Primer, W3C Recommendation, May 2, 2001.

W3C: XML Schma Part 1: Structures, W3C Recommendation May 2, 2001.

W3C: XML Schma Part 2: Datatypes W3C Recommendation May 2, 2001.

ISO/IEC JTC1/SC29/WG11 International Organisation for Standardisation, Coding of moving Pictures and Audio Title: Text of ISO/IEC 15938-1/PDAM1, MPEG/N5486, Awaji, Japan, Dec. 2002, XP-001131062.

ISO/IEC JTC1/SC29/WG11 International Organisation for Standardisation, Coding of moving Pictures and Audio Title: CE-4 bis: Proposal for a Schema Transmission Framework, Author: Maggi et al., XP-002330763, Dec. 2002, Awaji, Japan.

ISO/IEC FDIS 15938-1 [ISO/IEC JTC1] Information technology—Multimedia content description interface—Part 1: Systems.

Study of ISO/IEC 1593-1 FPDAM1 (Output Hawai Meeting).

* cited by examiner

FIG 2A

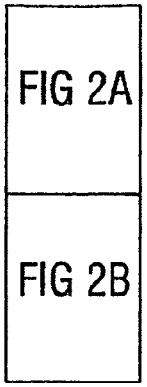

```
?xml version="1.0" encoding="ISO-8859-1"?>
<schema targetNamespace="urn:siemens:SchemaA"
xmlns:a="urn:mySchema:SchemaA"
xmlns:xs="http://www.w3.org/2001/XMLSchema"
    <complexType name="Node1">
        <sequence>
            <element name="name" type="xs:string"/>
            <element name="value" type="xs:integer"/>
        </sequence>
    </complexType>
    </complexType name="myFirstType">
        <complexContent>
            <extension base="a:Node1">
                <sequence>
                    <element name="state" type="xs:string"/>
                </sequence>
            </extension>
        </complexContent>
    </complexType>
    <complexType name="mySecondType">
        <complexContent>
            <extension base="a:myFirstType">
                <sequence>
                    <element name="id" type="xs:ID"/>
                </sequence>
            </extension>
        </complexContent>
    </complexType>
</schema>
<?xml version="1.0" encoding="ISO-8859-1"?>
<schema targetNamespace="urn: mySchema:SchemaX"
xmlns:x="urn:mySchema:SchemaX"
xmlns:a="urn:mySchema:SchemaA"
xmlns:xs="http://www.w3.org/2001/XMLSchema"
<import namespace="urn: mySchema:SchemaA"
  SchemaLocation="./TreeExample:nsA.xsd"/>
```

FIG 2B

```
<complexType name="tType">
    <sequence>
        <element name="name" type="xs:string"/>
        <element name="value" type="xs:integer"/>
    </sequence>
</complexType>
<complexType name="iType">
    <complexContent>
        <extension base="a:Node1">
            <sequence>
                <element name="state" type="xs:string"/>
            </sequence>
        </extension>
    </complexContent>
</complexType>
<complexType name="sType">
    <complexContent>
        <extension base="a:Node1">
            <sequence>
                <element name="id" type="xs:ID"/>
            </sequence>
        </extension>
    </complexContent>
</complexType>
</complexType name="nType">
    <complexContent>
        <extension base="x:sType">
            <sequence>
                <element name="price" type="xs:float"/>
            </sequence>
        </extension>
    </complexContent>
</complexType>
</schema>
```

METHOD AND DEVICE FOR CODING AND DECODING STRUCTURED DOCUMENTS

PRIORITY STATEMENT

This application is the national phase under 35 U.S.C. §371 of PCT International Application No. PCT/EP2005/050264 which has an International filing date of Jan. 21, 2005, which designated the United States of America and which claims priority on German Patent Application number 10 2004 009 617.1 filed Feb. 27, 2004, the entire contents of which are hereby incorporated herein by reference.

FIELD

The invention generally relates to a method and/or device for coding and decoding structured documents.

BACKGROUND

XML (=extensible markup language) is a language, which allows a structured description of the content of a document by way of XML schema language definitions. A more detailed description of the XML schema and the structures, data types and content models used therein can be found in the references http://www.w3.org/TR/2001/REC-xmlschema-0-20010502/, http://www.w3.org/TR/2001/REC-xmlschema-1-20010502/, http://www.w3.org/TR/2001/REC-xmlschema-2-20010502/.

Methods, devices or systems for coding and decoding XML-based documents are known from documents relating to the MPEG-7 standard, in particular ISO/IEC 15938-1 "Multimedia Content Description Interface—Part 1: Systems", Geneva 2002.

Extensions to the method, devices or systems for coding and decoding XML-based documents are known from documents relating to the MPEG-7 standard, from the German application with the official reference 10351897.5. This discloses a method for coding a structured document, in particular an XML-based document, with which a plurality of codes are generated by means of one or more schemas and/or name spaces, with respectively separate codes, which are independent of other schemas and/or name spaces, for the elements defined and/or declared in the schemas and/or name spaces and/or in the groups of schemas and/or name spaces, being allocated for a schema and/or name space and/or a group of schemas and/or name spaces.

These allow efficient coding, even where schemas are not known in full to the encoder and/or decoder. This is achieved in that code tables are separated based on name spaces for the data types, global elements and replacement groups, with a name space referring to a space, in which names of data types (type names) used therein are allocated unique meanings and defined therewith.

Known methods for the binary representation of MPEG-7 and other XML-based descriptions or documents have shortcomings in respect of encoding and decoding complexity, in so far as the XML description or XML document to be coded is based on a number of name spaces. For example, in the documents cited above a method is defined for the binary representation of XML descriptions and XML documents based on schemas and name spaces. (The term "name space" is hereafter used as a synonym for the term "schema").

According to the known method, data types can thereby be bequeathed from other data types. This inheritance relationship allows an instance of a bequeathed type to be used in an XML document instead of an instance of the basic type.

Based on the basic type the type code signals which type an instance is. Based on a basic type in a first name space, the inheritance structure must be analyzed over a number of name spaces during encoding and/or decoding to determine the addressable type names in a second name space. To this end an inheritance tree is established, as described in ISO/IEC 15938-1 "Multimedia Content Description Interface—Part 1: Systems", Geneva 2002.

This assumes that all the name spaces are known and the entire inheritance tree can be established in the memory. The entire inheritance tree comprises the qualifiers of the said types of all the name spaces referenced for the instantiation of an XML description and/or XML document and their inheritance relationship. The described method is therefore very complex.

SUMMARY

In at least one embodiment of the invention, a method and/or device are specified for coding and decoding structured documents that are relatively simpler than those of the prior art.

With the inventive method of at least one embodiment for coding a structured, in particular XML-based, document, with which a plurality of codes are generated by way of one or more name spaces and allocated for types defined by way of name spaces, a subset of addressable types of one of the name spaces is determined based on inheritance relationships between the name spaces and the name spaces of the basic types of the subset.

The method, in at least one embodiment, is advantageously characterized in that only a small number of all the name spaces present has to be stored or loaded to identify the addressable subset. This significantly reduces the load on resources and also accelerates coding.

Alternatively or additionally, with the method in at least one embodiment for coding a structured, in particular XML-based, document, for each name space an assignment to further name spaces is carried out such that at least one assignment information item is generated such that at least one inheritance relationship is described between an inheriting name space and bequeathing name spaces. A name space, which contains types, which are directly bequeathed by a basic type from another name space, is hereby referred to as an inheriting name space and a name space, which contains types, which were bequeathed in another name space, is referred to as a bequeathing name space.

The assignment information provided by this development allows a structured organization of inheritance information, such that only a part of the entire inheritance tree is required to identify the subset. This development thus results in further savings and load reduction in respect of resources as well as acceleration.

The assignment information of the inheriting name space is preferably formed from a list of codes of the basic types of header types of the inheriting name space, with header types being types, which originate directly from a basic type of the bequeathing name space, and with the basic types also being formed by header types, from which further header types result.

The addressable subset is preferably determined based on an initial basic type of the basic types of the bequeathing name space, with header types being identified in the inheriting name space by the assignment information to identify the subset, generally based on the initial basic type for determining the subset, said header types originating from a basic type from the bequeathing name space, with which the initial basic type is a basic type in the bequeathing name space.

Alternatively or additionally, with the method in at least one embodiment for coding a structured, in particular XML-based, document for at least one name space, the assignment information assigned to the inheriting name spaces is stored together with the respective name space in a first device carrying out the coding and/or decoding.

In one development, the assignment information assigned to the inheriting name spaces is generated in a second device and transmitted together with the respective name space in a first device carrying out the coding and/or decoding. The method in at least one embodiment described here is advantageous, as now only the name space of the basic type, the name space of the data type to be addressed and the inheritance relationship BT have to be known and/or loaded to determine the addressable data types.

One important advantage of the inventive method in at least one embodiment, is that it allows efficient determination of the addressable type names, without having to establish the entire inheritance tree. Furthermore this can also be done without knowledge of all the schemas or name spaces.

A further advantage is that the search for the addressed data type can be carried out with fewer comparison operations compared with the search in the entire inheritance tree.

In one embodiment the inheritance information BT of a name space NS comprises a list of type codes $TC^{LBT}$ of the basic types LBT for each header type HT of the name space NS.

In a further embodiment the type codes are allocated according to the following method to this end:

To code a structured document, a plurality of codes are generated by means of one or more schemas and/or name spaces. Separate codes, which are independent of other schemas and/or name spaces for the elements defined and/or declared in the schemas and/or name spaces and/or in the groups of schemas and/or name spaces, are thereby allocated for a schema and/or a name space and/or for a group of schemas and/or name spaces In a development of this, codes are allocated separately in schemas and/or name spaces. The method in at least one embodiment is advantageous, as schemas and/or name spaces can now be loaded as required even during the transmission of documents and existing code tables for other name spaces do not change as a result and therefore do not have to be recreated. A further advantage is that the separate codes for instances where a large number of name spaces are imported require fewer bits for addressing purposes than if all name spaces are combined, as in ISO/IEC 15938-1 "Multimedia Content Description Interface—Part 1: Systems", Geneva 2002. The separate codes for the other name spaces can be coded with fewer bits even in instances where a very large name space is imported.

In one preferred variant of at least one embodiment of the invention the separate codes are divided into address areas, it being possible to identify the schema and/or name space or group of schemas and/or name spaces via the address areas.

In one example embodiment of the inventive coding method, the separate codes each include a local code relating to the schema and/or name space and/or relating to the group of schemas and/or name spaces and an identification code, which identifies the schema and/or name space and/or the group of schemas and/or name spaces. A local code here is a code, which is unique within the schema or name space identified by the identification code.

Separate codes are preferably allocated for global elements and/or substitution groups and/or data types. A precise definition of global elements, substitution groups and data types can be found in the XML schema definitions, which are described in detail in the documents—http://www.w3.org/TR/2001/REC-xmlschema-0-20010502/, http://www.w3.org/TR/2001/REC-xmlschema-1-20010502/, http://www.w3.org/TR/2001/REC-xmlschema-2-20010502/.

For data types type codes, as described in the document ISO/IEC 15938-1 "Multimedia Content Description Interface—Part 1: Systems", Geneva 2002, in a preferred embodiment separate codes are generated such that within the inheritance tree of a name space the data type adjacent to a first data type in the same name space is at a code interval from the first data type, said interval corresponding to the number of data types derived from the first data type in this name space. A data type is adjacent to a first data type, when the data type is derived from the same basic data type as the first data type and the smallest type code has been assigned to the data type, out of all the data types derived from this basic data type, said type code being greater than the type code of the first data type. With this embodiment the codes for the data types type codes are allocated such within the—possibly disjoint—inheritance tree, that an advantageous adjacency relationship results and is maintained in a given name space, even if sub-trees containing types derived from other name spaces occur in this name space.

In a particular example embodiment of the inventive method, the separate codes are allocated within a given name space according to a method comprising the following steps:

in a first step all data types of a name space, which were bequeathed from data types of other name spaces, are sorted in a list in the sequence of global type codes of the respective basic data types as defined in the MPEG-7 standard, the basic data types being the data types in other name spaces, from which the sorted data types were bequeathed;

in a second step those data types of a name space, which were bequeathed from a specific basic data type of a specific other name space, are sorted lexicographically in each instance;

in a third step all the data types of a name space, which were not bequeathed from a data type of another name space, are sorted according to the sequence defined in the MPEG-7 standard into the existing list of data types;

in a fourth step the separate codes are allocated in list sequence to the data types of the name space.

The advantage of this example embodiment is that the addressed data type, in particular a type code, can be quickly found and thus decoded. According to the rules in ISO/IEC 15938-1 "Multimedia Content Description Interface—Part 1: Systems", Geneva 2002, a type code addresses a derived type relative to a basic type. The basic type thus defines a sub-tree, in which all addressable data types are present. If a number of name spaces are contained in the sub-tree, the advantageous adjacency relationship, as achieved with the above example embodiment of the invention, means that an addressed data type can be found quickly in the name space, as it can be established by comparing a searched for data type with two adjacent data types in the sorted inheritance tree, whether the searched for data type is in the sub-tree of the data type of the two adjacent data types with the smaller binary code. This can significantly reduce the time and effort required for the search. A further advantage of this adjacency relationship is that when coding the type codes according to ISO/IEC 15938-1 "Multimedia Content Description Interface—Part 1: Systems", Geneva 2002, a decoder can calculate the code word length, which is determined directly by the number of derived data types, directly from the code interval of the adjacent data types.

In a further embodiment, the local type codes are allocated according to the method described above, with the type code $TC^{LBT}$ being formed from the name space ID and local type code according to the method described above in one development.

In a further embodiment the local type codes are allocated according to the method described above and only basic types of the first name space are considered, the local type code of which a) is greater than the local type code of the initial basic type OBT and b) is smaller than the smallest, next largest local type code of a type adjacent to the initial basic type OBT.

In one example embodiment of the inventive method, the inheritance relationships BT between name spaces are stored and/or transmitted with a schema and/or name space.

In addition to example embodiment of the inventive coding method described above, the invention also relates to a decoding method, with which a structured document, in particular an XML-based document, is decoded, with the method being configured such that a document coded with an example embodiment of the inventive coding method is decoded.

In one example embodiment of the inventive decoding method, the code length of the separate code for the binary type code is determined from the number of derived data items to decode a binary type code—the generation of which is described above. Furthermore, in an example embodiment for decoding a specific type code of the sub-tree of the inheritance tree of the name space, in which the specific type code is located, the code length is preferably determined from the code intervals between adjacent data types.

In one development, to determine the basic types originating from an initial basic type the code length is determined from the code interval between adjacent data types.

In a further alternative or addition, the code length is determined to establish the number of types in the subset based on the header types using the code intervals between adjacent header types.

In addition to the method described above, an example embodiment of the invention also relates to a coding device and a decoding device to implement the inventive coding and/or decoding method. An example embodiment of the invention also includes a coding and decoding device, with which an embodiment of the inventive coding method and an embodiment of the inventive decoding method can be implemented.

BRIEF DESCRIPTION OF THE DRAWINGS

Example embodiments of the invention are described in more detail below with reference to the accompanying drawings, in which:

FIG. 2 shows a diagram of an example XML schema definition, in which data types from other name spaces are also imported and derived.

DETAILED DESCRIPTION OF THE EXAMPLE EMBODIMENTS

Figure 1:
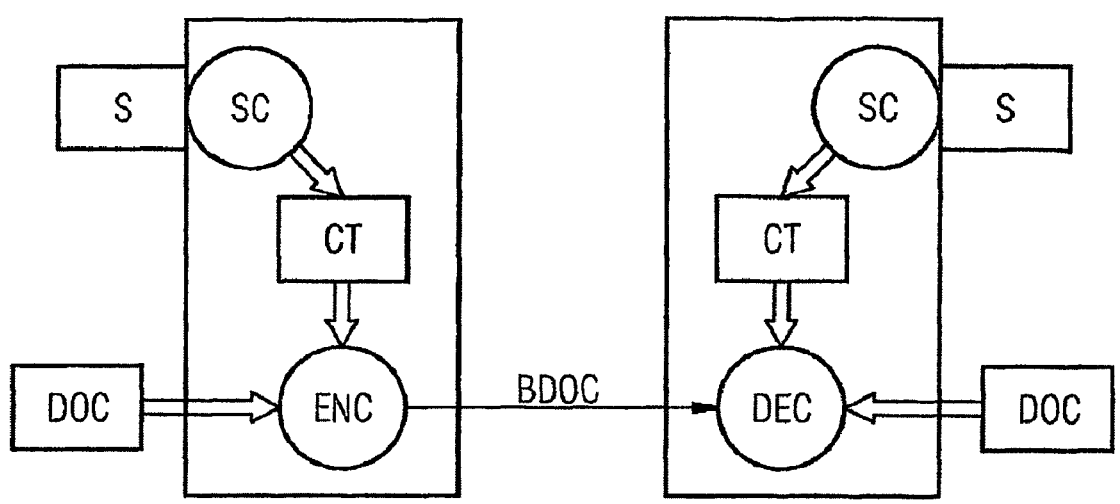
FIG. 1 shows a basic diagram of a coding and decoding system in which an example embodiment of the inventive method is brought to bear.

FIG. 1 shows an example embodiment of a coding and decoding system, in which the inventive method is used, with an encoder ENC and a decoder DEC, with which XML documents are coded and/or decoded. Both the encoder and the decoder have what is known as an XML schema S, in which the elements and types of the XML document used for communication are declared and defined. Code tables CT are generated in the encoder and decoder from the schema S via corresponding schema compilations SC. When the XML document DOC is coded, binary codes are assigned to the content of the XML document via the code tables. This generates a binary representation BDOC of the document DOC, which can be decoded again in the decoder with the aid of the code table CT. A number of schemas can be used here, in particular schemas can be deployed which are based on a basic schema and are derived from a further schema.

FIG. 2 shows an example extract from an XML schema definition. Such XML schema definitions are known to the person skilled in the art, so there is no need too look further at the exact content of the extract in FIG. 2. The extract contains two schema definitions. On the one hand a schema A is defined in the upper part, as shown by a curly bracket, and on the other hand a schema X is defined in the lower part, similarly shown by a curly bracket. The schema X in turn uses data types, which have been imported from the schema A.

Figure 3:
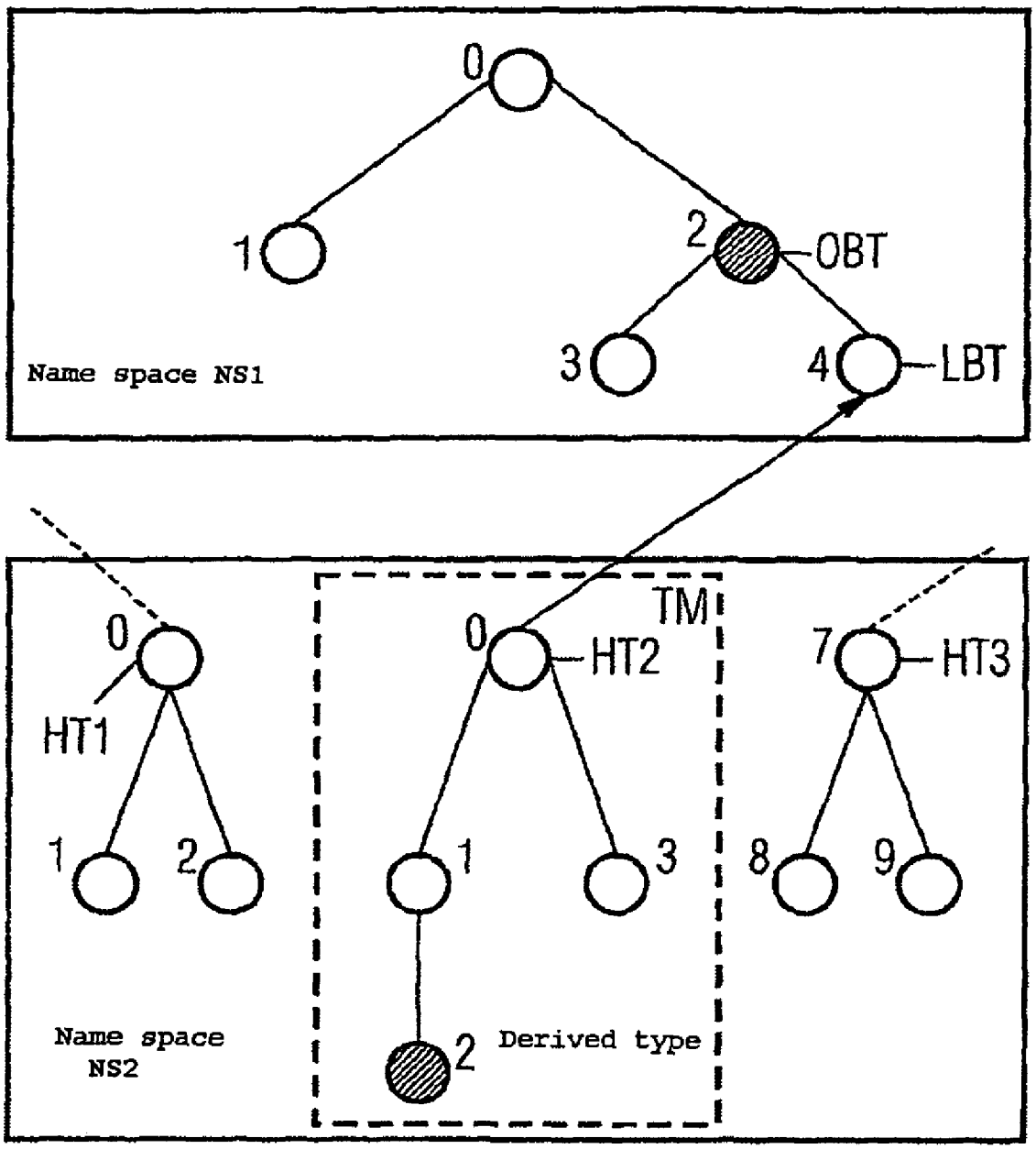
FIG. 3 shows a diagram of an inheritance tree of data types, including the assignment of local codes to types occurring in the name spaces.

FIG. 3 shows a graphic diagram of the inheritance relationships between a first name space NS1 and a second name space NS2 and their data types in the form of a section of a tree structure. As can be seen from the backward pointing, non-dashed arrow in the figure, there is an inheritance relationship between the second name space NS2 and the first name space NS1. Each node in the inheritance tree represents defined, named data type in the schema definition. With the method described in the German application with the official reference 10351897.5, local codes are allocated respectively for the name spaces NS1 . . . NS2, as specified in FIG. 3 by the numbers to the left of the nodes. These so-called local type codes address all types in a name space uniquely. With the inventive signaling of a data type based on an initial basic type OBT in the first name space NS1, the set of addressable types in the second name space NS2 is a subset TM—shown by the dashed border—of all types in the name space NS2. Only a few type codes are therefore used, as specified in FIG. 3 by the numbers to the right of the nodes and optionally only require a shorter binary representation.

Figure 4:
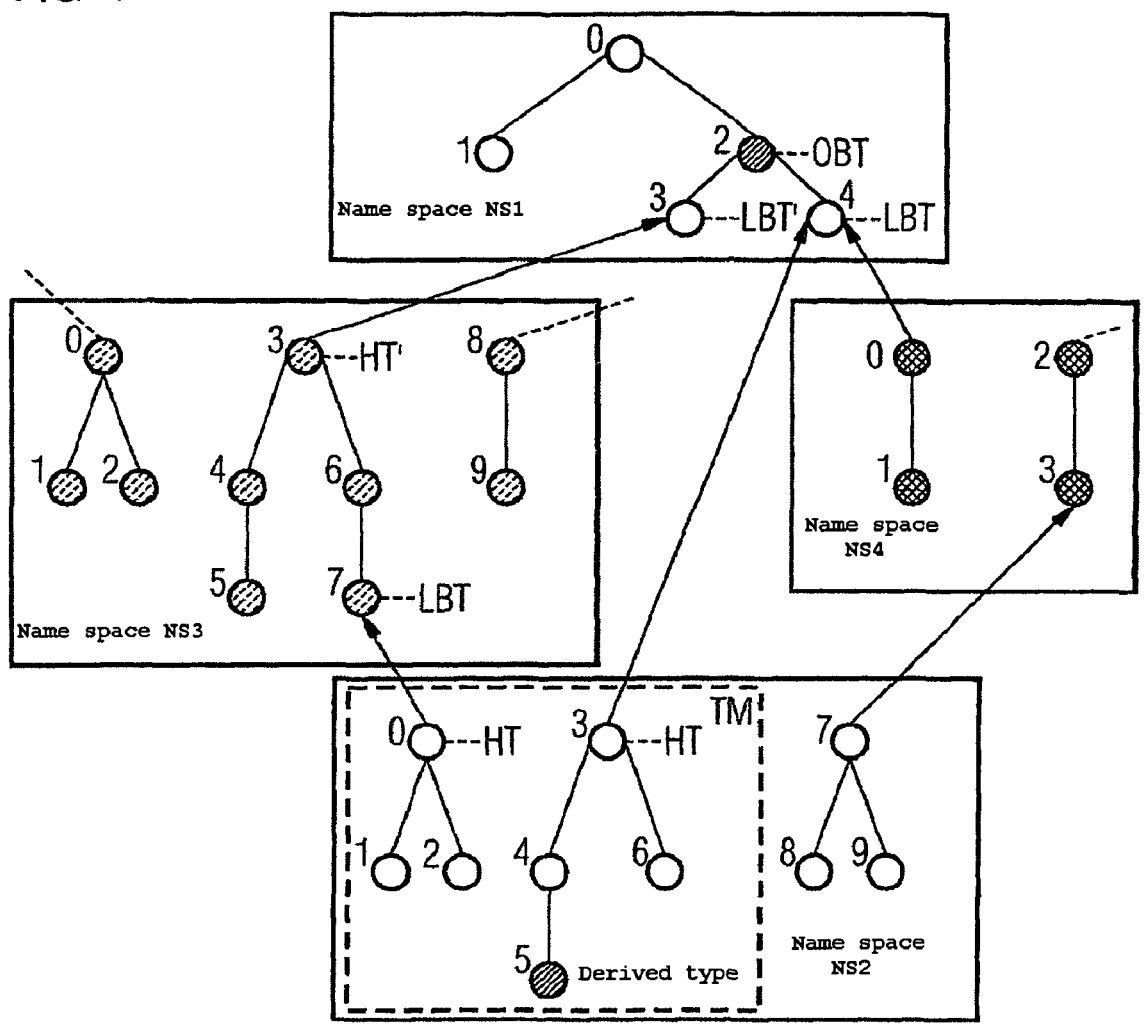
FIG. 4 shows a diagram of an inheritance tree of data types, which extends over a number of name spaces.

FIG. 4 shows four name spaces NS1 . . . NS4, between which indirect inheritance relationships also exist; i.e. inheritance relationships, with which at least one further name space from the name spaces NS1 . . . NS4 exists between a derived type and a basic type.

According to an example embodiment of the invention a set TM—shown by the dashed border in the diagram—of addressable types can now be defined based on the highlighted initial basic type OBT shown in the first name space NS1, by considering the inheritance relationships of all name spaces NS1 . . . NS4.

Figure 5:
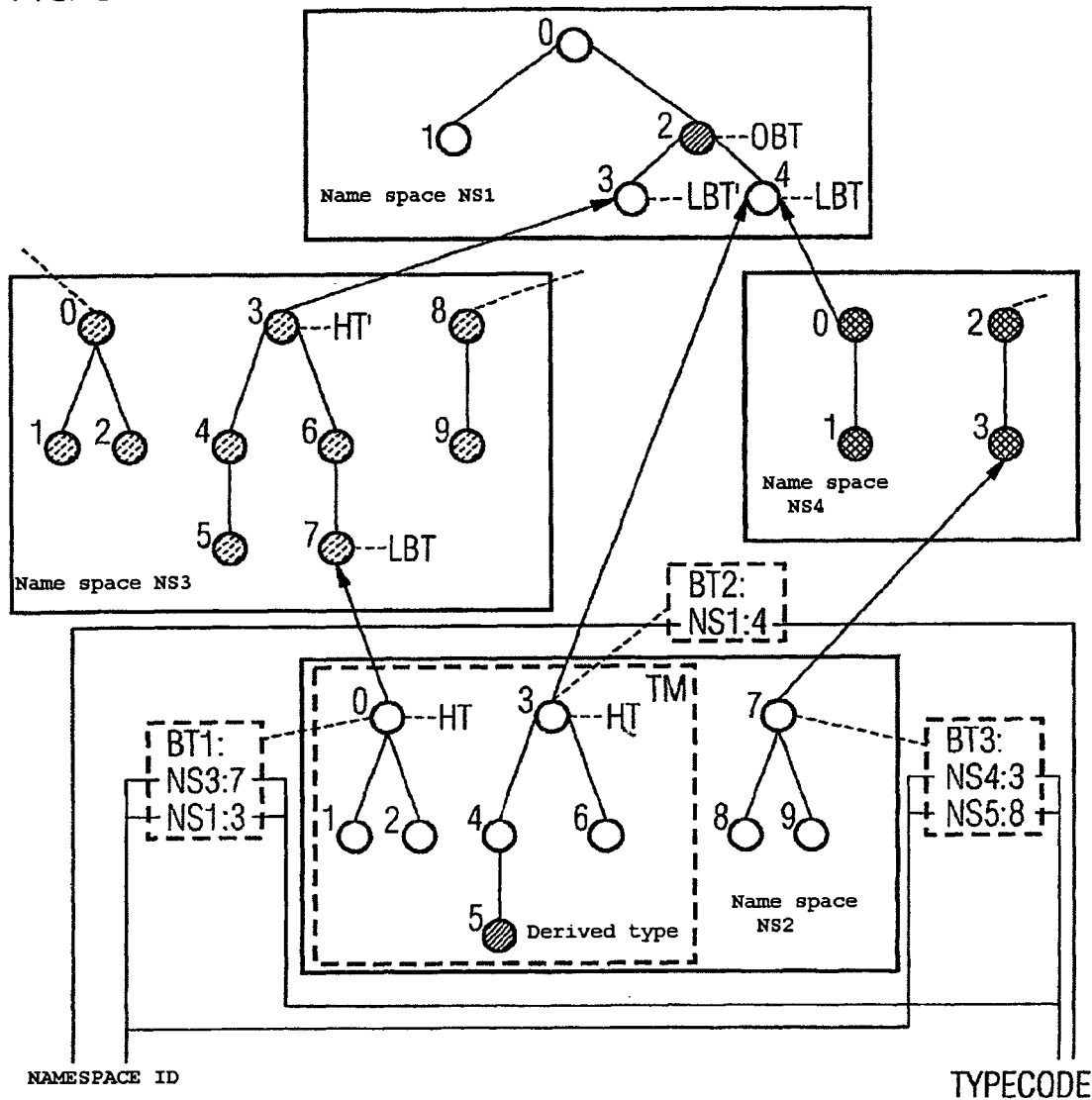
FIG. 5 shows a diagram of an inheritance tree including inheritance information between name spaces.

FIG. 5 shows the inheritance information BT1 . . . BT3 structured according to one variant of an example embodiment of the inventive method for the fourth name space NS4.

It can be seen that the structuring is such that for every data type, which is bequeathed directly from a data type from another name space (the respective direct inheritance is shown in each instance by a non-dashed backward pointing arrow), the inheritance information BT1 . . . BT3 is stored and/or transmitted from a first device to a second device, with the inheritance information BT1 . . . BT3 of a data type comprising a qualifier of the respective name space NAMESPACE_ID and the local type code of the basic types LBT, LBT' in the respective bequeathing name space NS1, NS3 and NS4 according to the variant shown.

Based on this structured inheritance information BT1 . . . BT3 the essence of the inventive method becomes clear in that instead of the entire inheritance tree, which results from the union of sets for the inheritance conditions of all name spaces, only the name spaces of initial basic types OBT, the types to be addressed and the inheritance relationship BT1 . . . BT3 between the name space (inheriting name space) containing the addressable types and the name space (bequeathing name space) containing the respective initial basic type OBT, are stored and used to determine the addressable data types TM.

The inheritance information (relationship) BT1 . . . BT3 thus essentially identifies basic types of header types of a name space, header types referring to the data types based directly on a basic type from a bequeathing name space, with those data types LBT of a bequeathing name space NS1, NS3 and NS4, which a) are the direct basic type (LBT) of a header type (HT) or b) are the direct basic type (LBT') of a header type (HT') of any further name space in the inheritance hierarchy—in the exemplary embodiment the third name space NS3—with the header type HT' being the direct or indirect basic type of the header type HT in the name space of the derived type, being basic types.

Based on this inventive structuring, with the inventive method the addressable data types TM are now identified in a second name space NS2 based on an initial basic type OBT in a first name space NS1, in that a) header types HT are identified in the second name space, for which types LBT and LBT' from the first name space are stored as inheritance information BT1 . . . BT3 and b) the type OBT is a basic type of the types LBT and LBT'.

A set of addressable types can thus simply be determined together with the inheritance tree of the inheriting name space based on a data type of the bequeathing name space NS1 to be established as a basic type, without having to have knowledge of all name spaces imported in the inheriting name space. This saves a tremendous amount of time and effort, minimizing computing and memory capacity requirements and accelerating coding and decoding.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method for coding a structured document, the method comprising:
   generating a plurality of codes using at least one name space and allocating the plurality of codes for data types defined by the at least one name space;
   assigning the at least one name space to another name space, such that at least one assignment information is generated, the assignment information including at least one inheritance relationship between the bequeathing namespace and the inheriting namespace,
   wherein the assignment information of the inheriting namespace includes at least one code of a basic data type of the bequeathing namespace for a header type of the inheriting namespace,
      the basic data type of the bequeathing namespace being a data type from which the header type of the inheriting namespace originates directly or the basic data type of the bequeathing name space being a basic data type of a yet another bequeathing name space in an inheritance hierarchy, the inheritance hierarchy including the yet another bequeathing name space, the bequeathing name space and the inheriting name space; and
   allocating respectively separate codes, independent of other schemas or name spaces and for elements either defined or declared in the schemas, name spaces, or in groups of schemas or name spaces, for another schema, a name space or for another group of schemas and name spaces, the allocation including:
      sorting all data types of a name space, which are bequeathed from data types of other name spaces, in a list in a sequence of global type codes of respective basic data types as defined in the MPEG-7 standard, the respective basic data types being the data types in other name spaces, from which the sorted data types are bequeathed;
      lexicographically sorting in each instance data types of a name space, which are bequeathed from a specific basic data type of a specific other name space;
      sorting according to the sequence defined in the MPEG-7 standard into the existing list of data types all the data types of a name space, which are not bequeathed from a data type of another name space; and
      allocating the separate codes in list sequence to the data types of the name space.

2. The method as claimed in claim 1, wherein a subset comprising addressable data types of the inheriting name space is determined based on an initial basic type of the bequeathing name space and on the basis of the inheritance relationship between the bequeathing and inheriting name spaces.

3. The method as claimed in claim 2, wherein the addressable subset is determined based on the initial basic type by establishing the basic types of the bequeathing name space.

4. The method as claimed in claim 3, wherein, based on the initial basic type of the bequeathing name space, the header type is determined in the inheriting name space and the basic type of the inheriting name space is identified from the bequeathing name space using the assignment information, the initial basic type of the inheriting name space being a basic type of the bequeathing name space.

5. A method for decoding a structured document, comprising:
   decoding a document previously coded according to a method as claimed in claim 4, wherein, to decode a specific type code, a sub-tree of the inheritance tree of the name space in which the specific type code is located is determined from the code intervals between adjacent data types.

6. The method as claimed in claim 1, wherein the assignment information assigned to the inheriting name spaces is stored together with the respective name space in a first device carrying out at least one of the coding and a decoding operation.

7. The method as claimed in claim 6, wherein the assignment information assigned to the inheriting name spaces is generated in a second device and transmitted together with the respective name space to the first device carrying out at least one of the coding and decoding operation.

8. The method as claimed in claim 1, wherein, to identify the at least one of schema, name space and the group of at least one of schemas and name spaces, the respectively separate codes are sub-divided into corresponding address areas.

9. The method as claimed in claim 1, wherein the separate codes respectively comprise a local code at least one of relating to at least one of the schema and the name space and relating to at least one of the group of schemas and name spaces and an identification code to identify at least one of the schema, name space and the group of at least one of schemas and name spaces.

10. The method as claimed in claim 1, wherein separate codes are generated for at least one of global elements, substitution groups and data types.

11. The method as claimed in claim 10, wherein separate codes are generated for data types type codes such that within the inheritance tree of a name space, the data type adjacent to a first data type in the same name space is at a code interval with respect to the first data type, said code interval corresponding to the number of data types derived from the first data type in this name space.

12. A method for decoding a structured document, comprising:
    decoding a document previously coded according to a method as claimed in claim 11 wherein, to decode a binary type code, the code length of the separate codes of the binary type codes is determined from the number of derived data types.

13. A method for decoding an XML-based document, comprising:
    decoding a document previously coded according to a method as claimed in claim 11, wherein, to decode a binary type code, the code length of the separate codes of the binary type codes is determined from the number of derived data types.

14. A method for decoding an XML-based document, comprising:
    decoding a document previously coded according to a method as claimed in claim 11, wherein, to decode a specific type code, a sub-tree of the inheritance tree of the name space in which the specific type code is located is determined from the code intervals between adjacent data types.

15. A method for decoding an XML-based document, comprising:
    decoding a document previously coded according to a method as claimed in claim 11, wherein, to determine the basic types originate from an initial basic type, code length is determined from the code intervals between adjacent data types.

16. A method for decoding an XML-based document, comprising:
    decoding a document previously coded according to a method as claimed in claim 11, wherein, to determine the number of types in the subset, code length is determined based on the header types from the code intervals between adjacent header types.

17. A method for decoding a structured document, comprising:
    decoding a document previously coded according to a method as claimed in claim 1.

18. A method as claimed in claim 17, for decoding an XML-based document.

19. A method for decoding an XML-based document, comprising:
    decoding a document previously coded according to a method as claimed in claim 1.

20. A method as claimed in claim 1, for coding an XML-based document.

* * * * *